US009852560B2

(12) United States Patent
Bauman et al.

(10) Patent No.: US 9,852,560 B2
(45) Date of Patent: Dec. 26, 2017

(54) VEHICLE REMOTE FUNCTION SYSTEM AND METHOD FOR EFFECTUATING VEHICLE OPERATIONS BASED ON VEHICLE FOB MOVEMENT

(71) Applicant: Lear Corporation, Southfield, MI (US)

(72) Inventors: Jason G. Bauman, Huntington Woods, MI (US); Thomas O'Brien, Troy, MI (US); Jian Ye, Troy, MI (US)

(73) Assignee: Lear Corporation, Southfield, MI (US)

( * ) Notice: Subject to any disclaimer, the term of this patent is extended or adjusted under 35 U.S.C. 154(b) by 357 days.

(21) Appl. No.: 14/178,324

(22) Filed: Feb. 12, 2014

(65) Prior Publication Data

US 2014/0253287 A1 Sep. 11, 2014

Related U.S. Application Data

(60) Provisional application No. 61/774,830, filed on Mar. 8, 2013, provisional application No. 61/788,789, filed on Mar. 15, 2013.

(51) Int. Cl.
*G07C 9/00* (2006.01)
*B60R 25/00* (2013.01)
*G01S 13/02* (2006.01)

(52) U.S. Cl.
CPC .......... *G07C 9/00309* (2013.01); *B60R 25/00* (2013.01); *G01S 13/0209* (2013.01)

(58) Field of Classification Search
CPC .. G07C 9/00309; G01S 13/0209; B60R 25/00
See application file for complete search history.

(56) References Cited

U.S. PATENT DOCUMENTS 5,051,751 A * 9/1991 Gray .................. H03H 17/0257
342/107
5,572,555 A 11/1996 Soenen et al.
(Continued)

FOREIGN PATENT DOCUMENTS

CN 1900654 A 1/2007
CN 102104435 A 6/2011
(Continued)

OTHER PUBLICATIONS

"Access Control System for Vehicles"; WO2005024734; Appenrodt (Daimler Chrysler); published Mar. 17, 2005; machine translation of description only; pp. 1-8.*

(Continued)

*Primary Examiner* — Brian Miller
(74) *Attorney, Agent, or Firm* — Brooks Kushman P.C.

(57) ABSTRACT

A vehicle remote function system is provided for use in effectuating vehicle operations based on movement of a fob relative to a vehicle. The system may include a controller for determining locations of the fob within zones proximate the vehicle based on ultra-wide band wireless signals transmitted between the antennas and the fob, the zones including a primary zone and secondary zones, each secondary zone at least partially within the primary zone. The controller may be configured to detect a movement of the fob between secondary zones and generate a control signal for use in effectuating a vehicle operation based on the movement detected. A method is also provided which may include transmitting ultra-wide band wireless signals between the fob and the antennas, detecting a movement of the fob between secondary zones, and generating a control signal for use in effectuating a vehicle operation based on the movement detected.

16 Claims, 2 Drawing Sheets

(56) References Cited

U.S. PATENT DOCUMENTS

| | | | |
|---|---|---|---|
| 5,794,155 A * | 8/1998 | Andresen | H04B 7/18558 342/358 |
| 5,832,046 A * | 11/1998 | Li | H04L 7/0054 375/326 |
| 5,867,411 A * | 2/1999 | Kumar | G01S 19/04 375/232 |
| 5,929,769 A * | 7/1999 | Garnault | B60R 25/2009 340/12.51 |
| 6,208,239 B1 * | 3/2001 | Muller | B60R 25/24 340/10.1 |
| 6,385,542 B1 | 5/2002 | Millington | |
| 6,552,649 B1 * | 4/2003 | Okada | B60R 25/2036 307/10.1 |
| 6,580,353 B1 | 6/2003 | Geber et al. | |
| 7,071,817 B2 * | 7/2006 | Haselsteiner | B60R 25/24 340/426.28 |
| 7,496,204 B2 | 2/2009 | Suzuki | |
| 7,705,710 B2 | 4/2010 | Hermann | |
| 7,843,318 B2 | 11/2010 | Funayose et al. | |
| 7,889,096 B2 * | 2/2011 | Breed | G08C 17/00 340/10.1 |
| 8,175,983 B2 | 5/2012 | Okada | |
| 8,232,863 B2 * | 7/2012 | Nakajima | B60R 25/245 340/5.61 |
| 8,248,233 B2 * | 8/2012 | Silverman | G01S 5/0294 340/539.13 |
| 8,284,020 B2 | 10/2012 | Ghabra et al. | |
| 8,319,605 B2 * | 11/2012 | Hassan | G01C 17/38 340/10.2 |
| 8,319,616 B2 | 11/2012 | Girard, III et al. | |
| 8,344,850 B2 * | 1/2013 | Girard, III | H04L 63/102 307/10.2 |
| 8,373,581 B2 * | 2/2013 | Hassan | G01C 17/38 340/426.18 |
| 8,427,276 B2 * | 4/2013 | McBride | B60R 25/245 340/5.64 |
| 8,560,492 B2 * | 10/2013 | Yuan | G05B 23/0221 706/62 |
| 8,572,555 B2 | 10/2013 | Alberi et al. | |
| 8,838,481 B2 | 9/2014 | Moshfeghi | |
| 8,872,620 B2 | 10/2014 | Higemoto et al. | |
| 8,935,052 B2 * | 1/2015 | Hermann | B60R 25/20 701/302 |
| 9,161,175 B1 * | 10/2015 | Smith | G01S 19/48 |
| 9,679,430 B2 * | 6/2017 | O'Brien | G07C 9/00309 |
| 2007/0018799 A1 | 1/2007 | Funayose et al. | |
| 2007/0090965 A1 | 4/2007 | McCall | |
| 2007/0146120 A1 * | 6/2007 | Kachouh | B60R 25/245 340/5.72 |
| 2007/0162191 A1 | 7/2007 | Matsubara et al. | |
| 2007/0222746 A1 | 9/2007 | LeVine | |
| 2008/0232431 A1 | 9/2008 | Sanji et al. | |
| 2009/0143923 A1 * | 6/2009 | Breed | G08G 1/205 701/1 |
| 2009/0289759 A1 | 11/2009 | Tsuchiya et al. | |
| 2010/0032298 A1 | 2/2010 | Kaihori et al. | |
| 2010/0076622 A1 * | 3/2010 | Dickerhoof | B60R 25/24 701/2 |
| 2010/0097239 A1 | 4/2010 | Campbell | |
| 2010/0148947 A1 | 6/2010 | Morgan et al. | |
| 2010/0171642 A1 | 7/2010 | Hassan et al. | |
| 2010/0308961 A1 | 12/2010 | Ghabra | |
| 2011/0109447 A1 | 5/2011 | Saguchi | |
| 2011/0218709 A1 | 9/2011 | Hermann | |
| 2011/0242303 A1 * | 10/2011 | Giraud | E05B 81/78 348/77 |
| 2011/0254503 A1 | 10/2011 | Widmer et al. | |
| 2011/0257973 A1 | 10/2011 | Chutorash et al. | |
| 2011/0309922 A1 | 12/2011 | Ghabra et al. | |
| 2012/0092129 A1 | 4/2012 | Lickfelt | |
| 2012/0158253 A1 * | 6/2012 | Kroemke | B60R 25/2054 701/49 |
| 2012/0218128 A1 | 8/2012 | Tieman et al. | |
| 2012/0223810 A1 | 9/2012 | Petrucci et al. | |
| 2012/0239248 A1 | 9/2012 | Bobbitt | |
| 2012/0262340 A1 | 10/2012 | Hassan et al. | |
| 2012/0282906 A1 | 11/2012 | Frye et al. | |
| 2012/0286926 A1 | 11/2012 | Higemoto et al. | |
| 2013/0342379 A1 * | 12/2013 | Bauman | G01S 13/0209 342/21 |
| 2014/0136024 A1 | 5/2014 | Herthan | |
| 2014/0253287 A1 | 9/2014 | Bauman et al. | |
| 2014/0253288 A1 | 9/2014 | O'Brien et al. | |
| 2015/0258962 A1 * | 9/2015 | Khanu | B60R 25/2054 701/49 |
| 2015/0291126 A1 * | 10/2015 | Nicholls | B60R 25/2054 701/49 |

FOREIGN PATENT DOCUMENTS

| | | |
|---|---|---|
| CN | 102398566 A | 4/2012 |
| CN | 102602363 A | 7/2012 |
| CN | 102703516 A | 10/2012 |
| CN | 102758567 A | 10/2012 |
| CN | 104903157 A | 9/2015 |
| DE | 69913607 T2 | 9/2004 |
| DE | 10341286 A1 | 4/2005 |
| DE | 102006037237 A1 | 2/2008 |
| DE | 10 2010 063 702 A1 | 6/2010 |
| DE | 102012203327 A1 | 9/2012 |
| FR | 2934223 A3 | 1/2010 |
| GB | 2498837 A | 7/2013 |
| GB | 2505287 | 2/2014 |
| GB | 2505287 A | 2/2014 |
| GB | 2509579 A | 7/2014 |
| JP | 2006299408 A | 11/2006 |
| JP | 2008231734 A | 10/2008 |
| WO | 2005024734 | 3/2005 |
| WO | 2007070739 A2 | 6/2007 |
| WO | 2007073969 | 7/2007 |
| WO | 2013010643 A1 | 1/2013 |

OTHER PUBLICATIONS

United Kingdom Patent Office, Combined Search and Examination Report for GB Patent Application No. GB1403658.6 dated May 20, 2014.

German Patent and Trademark Office, Office Action for the corresponding German Patent Application No. 10 2014 204 111.2 dated Jul. 23, 2014.

Bloecher, Hans Ludwig et al., Trends in Automotive RF Wireless Applications and their Electromagnetic Spectrum Requirements, DaimlerChrysler AG, Research & Technology, 2005.

United States Patent and Trademark Office, Non-Final Office Action dated Apr. 14, 2015 for U.S. Appl. No. 13/923,522.

United States Patent and Trademark Office, Final Office Action dated Jul. 28, 2015 for U.S. Appl. No. 13/923,522.

Great Britain Patent Application No. 1403659.4, Combined Search and Examination Report dated Aug. 29, 2014.

Notice of Allowance for U.S. Appl. No. 13/923,522 dated Sep. 14, 2015.

Notice of Allowance for U.S. Appl. No. 13/923,522 dated Jan. 11, 2016.

United States Patent and Trademark Office, Office Action for U.S. Appl. No. 14/178,340 dated Apr. 19, 2016.

Chinese Patent Office, First Office Action for the corresponding Chinese Patent Application No. 201410081735.1 dated Jan. 4, 2016.

Chinese Patent Office, Second Office Action for the corresponding Chinese Patent Application No. 201410081735.1 dated Sep. 5, 2016.

United States Patent and Trademark Office, non-final Office Action for U.S. Appl. No. 13/923,522 dated Apr. 14, 2015.

United States Patent and Trademark Office, final Office Action for U.S. Appl. No. 13/923,522 dated Jul. 28, 2015.

United States Patent and Trademark Office, non-final Office Action for U.S. Appl. No. 14/178,340 dated Nov. 4, 2015.

United States Patent and Trademark Office, non-final Office Action for U.S. Appl. No. 14/178,340 dated Aug. 19, 2016.

(56) References Cited

OTHER PUBLICATIONS

United States Patent and Trademark Office, Notice of Allowance for U.S. Appl. No. 14/178,340 dated Dec. 27, 2016.
United States Patent and Trademark Office, Notice of Allowance for U.S. Appl. No. 13/923,522 dated Jan. 12, 2017.
U.S. Patent and Trademark Office, non-final Office Action for U.S. Appl. No. 13/923,522 dated Mar. 29, 2017.

\* cited by examiner

-- Prior Art --

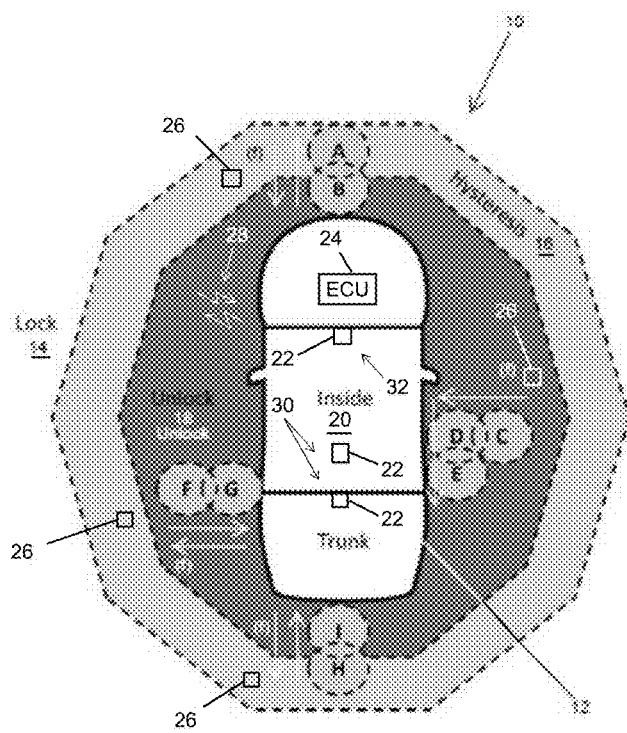
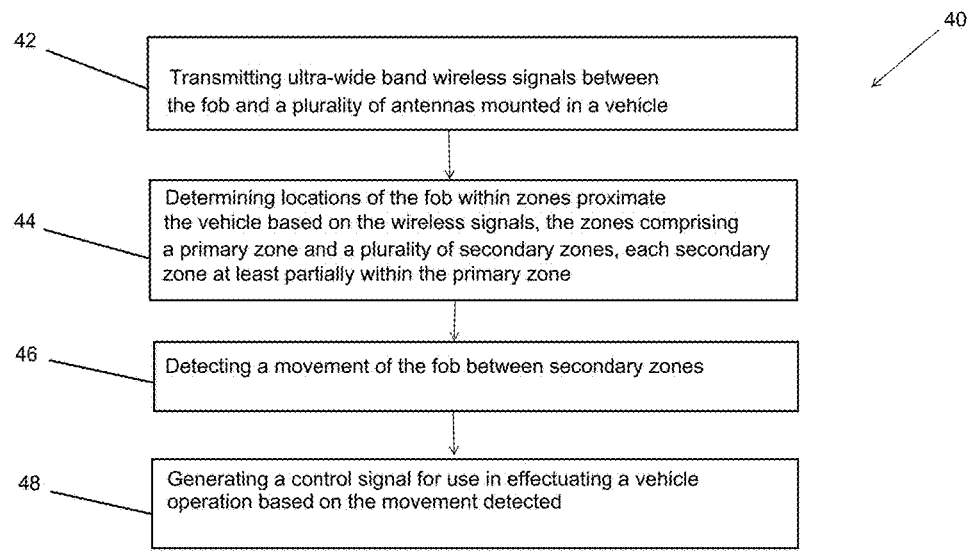
Figure 2
Figure 3

VEHICLE REMOTE FUNCTION SYSTEM AND METHOD FOR EFFECTUATING VEHICLE OPERATIONS BASED ON VEHICLE FOB MOVEMENT

CROSS-REFERENCE TO RELATED APPLICATIONS

The present application claims the benefit of U.S. Provisional Patent Application No. 61/774,830 filed on Mar. 8, 2013, and U.S. Provisional Patent Application No. 61/788,789 filed on Mar. 15, 2013, the disclosures of which are incorporated in their entirety by reference herein.

TECHNICAL FIELD

The following relates to a vehicle remote function system and a method for use in effectuating vehicle operations based on movement of a fob relative to a vehicle.

BACKGROUND

Automotive vehicles may include passive entry systems that allow a user to access and start a vehicle just by holding a key, key fob or card. In operation, such systems may perform and/or enable vehicle access and vehicle start functions based on a determined location of the key in or around the vehicle.

To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob.

There exists a need for a vehicle remote function system and a method for effectuating vehicle operations based on movement of a fob relative to a vehicle. Such a system and method would use ultra-wide band wireless signals communicated between the fob and vehicle mounted antennas to detect movement of the fob within multiple zones proximate the vehicle, and generate a control signal for use in effectuating a vehicle operation based on the movement detected, which may be interpreted as indicative of a user command for the vehicle operation.

SUMMARY

According to one embodiment disclosed herein, a vehicle remote function system is provided for use in effectuating vehicle operations based on movement of a fob relative to a vehicle. The system may comprise a controller adapted to be mounted in the vehicle and configured for communication with a plurality of antennas mounted at different locations in the vehicle, the controller for use in determining locations of the fob within zones proximate the vehicle based on ultra-wide band wireless signals transmitted between the antennas and the fob, the zones comprising a primary zone and a plurality of secondary zones, each secondary zone at least partially within the primary zone. The controller may be configured to detect a movement of the fob between secondary zones and generate a control signal for use in effectuating a vehicle operation based on the movement detected.

According to another embodiment disclosed herein, a method is provided for use in a vehicle remote function system, the method for effectuating vehicle operations based on movement of a fob relative to a vehicle. The method may comprise transmitting ultra-wide band wireless signals between the fob and a plurality of antennas mounted in the vehicle, and determining locations of the fob within zones proximate the vehicle based on the wireless signals, the zones comprising a primary zone and a plurality of secondary zones, each secondary zone at least partially within the primary zone. The method may further comprise detecting a movement of the fob between secondary zones, and generating a control signal for use in effectuating a vehicle operation based on the movement detected.

A detailed description of these embodiments is set forth below together with accompanying drawings.

BRIEF DESCRIPTION OF THE DRAWINGS

FIG. 2 is a simplified, exemplary diagram of a vehicle remote function system, including exemplary coverage zones, for use in effectuating vehicle operations based on movement of a fob relative to a vehicle; and FIG. 3 is a simplified, exemplary flowchart of a method for use in a vehicle remote function system, the method for use in effectuating vehicle operations based on movement of a fob relative to a vehicle.

DETAILED DESCRIPTION

Figure 1:
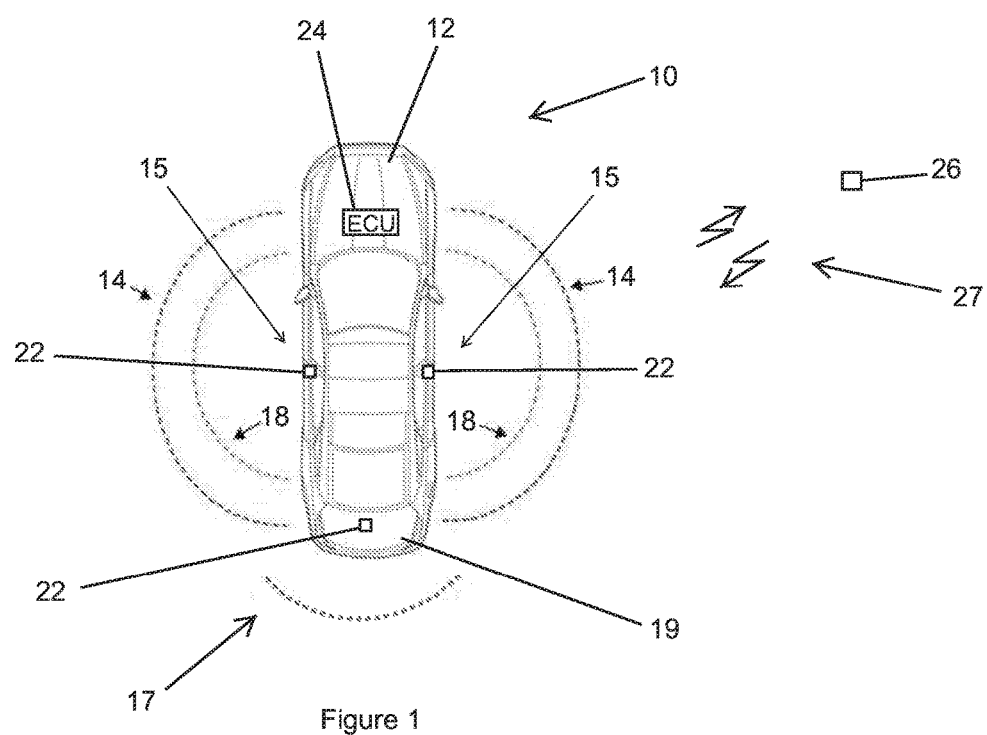
FIG. 1 is a simplified, exemplary diagram of a prior art passive entry system, including coverage zones.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

With reference to FIGS. 1-3, various embodiments of the method and system disclosed herein are shown and described. For ease of illustration and to facilitate understanding, similar reference numerals have been used throughout the following description to denote similar elements, parts, items or features in the drawings, where applicable.

As described previously, automotive vehicles may include passive entry systems that allow a user to access and start a vehicle just by holding a key, key fob or card. In operation, such systems may perform and/or enable vehicle access and vehicle start functions based on a determined location of the key in or around the vehicle. To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob. There exists a need for a vehicle remote function system and a method for effectuating vehicle operations based on movement of a fob relative to a vehicle. Such a system and method would use ultra-wide band wireless signals communicated between the fob and vehicle mounted antennas to detect movement of the fob within multiple zones proximate the vehicle, and generate a control signal for use in effectuating a vehicle operation based on the movement detected, which may be interpreted as indicative of a user command for the vehicle operation.

FIG. 1 is a simplified, exemplary diagram of a prior art passive entry system 10 for a vehicle 12, including coverage zones 14, 18, 17. As seen therein, the applicable zones 14, 18, 17 are localized to areas around the doors 15 and trunk 19. Current passive entry systems 10 use low frequency (LF) antennas 22 located in the handles of the doors 15 and in the trunk 19, and that provide relatively small, concentrated lock/unlock zones 14, 18, 17 just around the individual doors 15 and the trunk 19. Locking/unlocking functions occur inside/outside the zones 14, 18, 17 as a result of wireless communication 27 of a vehicle-mounted controller or Electronic Control Unit (ECU) 24 with a key fob 26 via antennas 22.

For example, when the fob 26 is brought inside a range 18 of about 1.5 meters around the vehicle doors 15, an unlock command may be issued that results in the performance of a vehicle door unlock function or operation. When the fob 26 is taken outside a range 14 of about 2.0 meters around the vehicle doors 15, a lock command may be issued that results in the performance of a vehicle door lock function or operation. All other areas outside of these small zones 14, 18, 17 are "dead zones" where no locking or unlocking functions occur.

As previously described, the ECU or controller 24 determines the location of the key fob 26 based on the transmission of radio frequency (RF) or low frequency (LF) signals 27 (e.g., 125 kHz) between the antenna (not shown) of fob 26 and the vehicle based antennas 22, typically by using the strength of the signals 27 to indicated range. The zones 14, 18, 17 created with the use of antennas 22 are three-dimensional and have a spherical shape, but also may be described as having a circular or arching shape in a cross-section of the zones 14, 18, 17 taken in a horizontal plane substantially parallel to the ground.

FIG. 2 is a simplified, exemplary diagram of a vehicle remote function system 10, including exemplary coverage zones 14, 16, 18 for effectuating vehicle operations based on movement of a fob 26 (f) relative to a vehicle 12. Using ultra-wide band wireless technology, exemplary zones 14, 16, 18 may be custom tailored for individual vehicle needs and customer requirements. The remote function system 10 shown in FIG. 2 and disclosed herein uses ultra-wide band (UWB) wireless signals 28 communicated between the fob 26 and vehicle mounted antennas 22 to detect movement of the fob 26 within multiple zones 14, 16, 18, A, B, C, D, E, F, G, H and I proximate the vehicle 12, and generates a control signal (not shown) for use in effectuating a vehicle operation based on the movement detected, which may be interpreted as indicative of a user command for the vehicle operation.

The system 10 shown in FIG. 2 implements full lock and unlock zones 14, 18, as well as hysteresis zone 16, around the entire vehicle 12. Using a Kalman filter and/or other filters or filtering techniques, the controller or ECU 24 may locate the fob 26 around the entire vehicle 12. In particular, the controller 24 may locate and track the fob 26 in and out of zones 14, 18 in order to perform locking/unlocking functions relative to the location of the fob 26, such as performing an unlock operation when the fob 26 moves into zone 18, and a lock operation when the fob 26 moves outside zone 14.

Ultra-wide band (UWB) antennas 22 at various locations in/on the vehicle 12 can provide tailored lock/unlock zones 14, 18 around the entire vehicle 12, with locking/unlocking or other vehicle functions occurring inside/outside zones 14, 18 as a result of wireless communication via UWB signals 28 between the ECU 24 and the key fob 26. In that regard, and as used herein, an antenna 22 may be an internal antenna of an UWB transceiver unit, or an antenna in communication with a centrally located UWB transceiver, such as via coaxial cabling, which centrally located UWB transceiver may be provided as part of ECU 24.

The UWB antennas 22 may be positioned at different locations in/on the vehicle 12. As seen in FIG. 2, one antenna 22 may be located in the instrument panel area 32 of the vehicle 12, while other antennas 22 may be located in the headliner 30 of the vehicle 12. It should be noted, however, that any number of antennas 22 may be employed and may be positioned at any of a variety of locations in/on the vehicle 12.

While three substantially decagonal zones 14, 16, 18 are depicted in FIG. 2, any number of zones of other shapes and sizes/ranges may be employed or created. In that regard, the UWB system 10 of FIG. 2 permits as many zones to be created as desired, with each zone having any type of shape, size and/or location desired, including inside 20 the vehicle 12 or outside the vehicle 12, on one or both sides of the vehicle 12, and/or in front or back of the vehicle 12, which zones may or may not circumscribe, envelope or encompass the vehicle 12, in whole or in part, and may have any orientation.

For example, in contrast to the prior art passive entry system depicted in FIG. 1, which has spherical shaped zones 14, 16, 17, the vehicle remote function system 10 illustrated in FIG. 2 allows for zones 14, 16, 18 having sharp corners. The zones 14, 16 may be three-dimensional prisms, having a substantially decagonal cross-section in a horizontal plane parallel to the ground. Other shapes, however, may alternatively be used for these or additional zones, which may be spheres, regular or uniform three-dimensional prisms, or irregular or non-uniform in shape or volume. As well, differently shaped zones may be provided for use in remotely performing different vehicle functions, such as an arched zone for a door unlock function, an octagonal zone for a door lock function, and a square zone for a trunk release function.

Such zones may also be located inside 20 the vehicle 12 or outside the vehicle 12, and may have any volume. For example, primary zones 14, 16, 18 illustrated in FIG. 2 are located outside the vehicle 12 and encompass and/or have a volume greater than that of the vehicle 12. However, the system shown in FIG. 2 allows for zones that may be located inside the vehicle 12 and/or outside 20 the vehicle 12 on one side thereof, such as may be desired to allow a door unlock function only when the fob 26 approaches the vehicle 12 from one side.

The system 10 of FIG. 2 also allows for secondary zones that may be located inside 20 the vehicle 12, in whole or in part, and that may have a relatively small volume, such as less than the volume of an average person. Such smaller secondary zones located inside 20 the vehicle 12 may be used to determine the precise location of the fob 26 within the vehicle 12, such as in a vehicle glove box and/or for use in push-to-start systems.

The secondary zones employed or created may also be provided for use in remote performance of other vehicle functions in addition to or instead of remote door lock/unlock or trunk release. For example, a combination of secondary zones may be created outside the vehicle 12 which can be used to recognize gestures by a user as the fob 26 moves (which may include back and forth movement) between zones in order to perform remote engine start, headlight activation and/or any other type of vehicle function.

More particularly, with the Ultrawide Band (UWB) Passive Entry Passive Start (PEPS) system 10 shown in FIG. 2, a position of a fob 26 (f) near a vehicle 12 may be accurately determined. The location of a fob 26 (f) may be tracked by the vehicle mounted controller 24 using UWB wireless signals 28 transmitted between a fob 26 and vehicle mounted antennas 22 so that a simple movement of the fob 26 may be used to activate a vehicle operation.

In that regard, FIG. 2 shows secondary zones A, B, C, D, E, F, G, H and I, which are similar to locking 14, hysteresis 16, and unlock 18 zones in that they are areas in which a fob 26 (f) may move. By setting up or establishing secondary zones such as A, B, C, D, E, F, G, H and I, the controller 24 may track movement of a fob 26 from zone A to B to A (as shown by the associated arrows) with specific timing. For example, the controller 24 may detect movement of a fob 26 by detecting a presence of the fob 26 within zone A for a time period of >500 ms, followed by a presence of the fob 26 in zone B for a time period of >250 ms, followed by a presence of the fob 26 in zone A again for a time period of >500 ms, with an overall time period for such fob movements of <2500 ms.

Additional movements could be created to require a side step or more complicated movements, such as depicted by the arrows showing movements associated with secondary zones C, D and E. Exemplary vehicle operations or features that may be activated by any such detected movement of the fob 26 by the controller 24 may include headlamps turning on (e.g., in response to fob movement from zone A to B and back to A), side door opening in a minivan (e.g., in response to fob movement from zone C to D to E), gas door release (e.g., in response to fob movement from zone F to G and back to F), trunk release (e.g., in response to fob movement from zone H to I and back to H), or other vehicle operations or functions (e.g., perimeter lighting activation, door lock or unlock, alarm activation/deactivation, remote engine start, etc.).

With reference again to FIG. 2, a vehicle remote function system 10 is provided for use in effectuating vehicle operations based on movement of a fob 26 relative to a vehicle 12. The system 10 may comprise a controller 24 adapted to be mounted in the vehicle 12 and configured for communication with a plurality of antennas 22 mounted at different locations in the vehicle 12. The controller 24 may be for use in determining locations of the fob 26 within zones 14, 16, 18, A, B, C, D, E, F, G, H and/or I proximate the vehicle 12 based on ultra-wide band wireless signals 28 transmitted between the antennas 22 and the fob 26. The zones 14, 16, 18, A, B, C, D, E, F, G, H and/or I may comprise a primary zone (e.g., zone 14, 16 or 18), and a plurality of secondary zones (e.g., A, B, C, D, E, F, G, H and/or I), with each secondary zone lying at least partially within the primary zone.

The controller 24 may be configured to detect a movement of the fob 24 between secondary zones (e.g., A and B) and to generate a control signal for use in effectuating a vehicle operation based on the movement detected. In that regard, the controller 24 may be further configured to interpret the detected movement of the fob 26 as indicative of a user command for a vehicle operation.

Each secondary zone A, B, C, D, E, F, G, H and/or I may at least partially overlap another secondary zone A, B, C, D, E, F, G, H and/or I. Moreover, movement of the fob 26 between secondary zones A, B, C, D, E, F, G, H and/or I may comprise a movement of the fob 26 from a first one of the secondary zones (e.g., A) to a second one of the secondary zones (e.g., B) within a predetermined time period. Movement of the fob 26 between secondary zones A, B, C, D, E, F, G, H and/or I may also or alternatively comprise a presence of the fob 26 in a first one of the secondary zones (e.g., A) for greater than a first period of time followed by a presence of the fob 26 in a second one of the secondary zones (e.g., B) for greater than a second period of time. A movement of the fob 26 between secondary zones A, B, C, D, E, F, G, H and/or I may further comprise, after the presence of the fob 26 in the second one of the secondary zones (e.g., B) for greater than the second period of time, a presence of the fob 26 in the first one of the secondary zones (e.g., A) for greater than a third period of time.

Still referring to FIG. 2, the plurality of secondary zones A, B, C, D, E, F, G, H and/or I may comprise three secondary zones (e.g., C, D and E). In that regard, movement of the fob 26 between secondary zones may comprise a first movement of the fob 26 from a first one of the secondary zones (e.g., C) to a second one of secondary zones (e.g., D) followed by a second movement of the fob from the second one of the secondary zones (e.g., D) to a third one of the secondary zones (e.g., E), where the first and second movements may occur with a predetermined period of time.

The vehicle operation(s) which may be effectuated by detection of fob movement by the controller 24 may comprise headlamp activation, door opening, fuel door release, trunk release, perimeter light activation, alarm activation/deactivation or engine remote start. As previously described, the primary zone may comprise an unlock zone 18 outside the vehicle 12 and the plurality of secondary zones may be located adjacent a side, front and/or rear of the vehicle 12, although secondary zones inside 20 the vehicle 12 are also contemplated and may be implemented.

The system 10 may further comprise a plurality of antennas 22 adapted to be mounted at different locations in the vehicle 12, each antenna for use in transmitting and/or receiving ultra-wide band wireless signals 28 to and/or from the fob 26. The system 10 may further comprise a fob 26 for use in transmitting and/or receiving ultra-wide band wireless signals 28 to and/or from the antennas 22. The plurality of antennas 22 may comprise an antenna 22 adapted to be mounted in a vehicle headliner 30 and an antenna 22 adapted to be mounted in a vehicle instrument panel area 32. The controller 24 may also be configured to determine the location of the fob using a Kalman filter, other filters or filtering techniques, trilateration, triangulation, or any other similar means or method.

As also seen in FIG. 2, when the fob 26 is brought inside a first range 18 anywhere around the vehicle 12, an unlock command may be issued that results in the performance of a vehicle door unlock function or operation. When the fob 26 is taken outside a second range 14 anywhere around the vehicle 12, a lock command may be issued that results in the performance of a vehicle door lock function or operation.

Referring next to FIG. 3, a simplified, exemplary flowchart of a method 40 is shown for use in a vehicle remote function system, the method 40 for effectuating vehicle operations based on movement of a fob relative to a vehicle. As seen therein, the method 40 may comprise transmitting 42 ultra-wide band wireless signals between the fob and a plurality of antennas mounted in the vehicle, and determining 44 locations of the fob within zones proximate the vehicle based on the wireless signals, the zones comprising a primary zone and a plurality of secondary zones, each secondary zone at least partially within the primary zone. The method may further comprise detecting 46 a movement of the fob between secondary zones, and generating 48 a control signal for use in effectuating a vehicle operation based on the movement detected.

In that regard, the method 40 may further comprise interpreting the detected movement of the fob as indicative of a user command for the vehicle operation. According to the method 40, a movement of the fob between secondary zones may comprise a movement of the fob from a first one of the secondary zones to a second one of the secondary zones within a predetermined time period.

Moreover, each secondary zone may at least partially overlap another secondary zone. Movement of the fob between secondary zones may also or alternatively comprise a presence of the fob in a first one of the secondary zones for greater than a first period of time followed by a presence of the fob in a second one of the secondary zones for greater than a second period of time. A movement of the fob between secondary zones may further comprise, after the presence of the fob in the second one of the secondary zones for greater than the second period of time, a presence of the fob in the first one of the secondary zones for greater than a third period of time.

The plurality of secondary zones may also or alternatively comprise three secondary zones. In that regard, a movement of the fob between secondary zones may comprise a first movement of the fob from a first one of the secondary zones to a second one of secondary zones followed by a second movement of the fob from the second one of the secondary zones to a third one of the secondary zones, where the first and second movements occur with a predetermined period of time.

According to the method 40, the vehicle operation which may be effectuated by detection of fob movement may comprise comprises headlamp activation, door opening, fuel door release, trunk release, perimeter light activation, alarm activation/deactivation or engine remote start. As previously described, the primary zone may comprise an unlock zone outside the vehicle and the plurality of secondary zones may located adjacent a side, front and/or rear of the vehicle, although secondary zones inside 20 the vehicle 12 are also contemplated and may be implemented.

The activities, functions or steps of the system 10 and method 40 for effectuating vehicle operations based on movement of a fob 26 relative to a vehicle 12 described above may also be implemented in or as a computer readable medium having non-transitory computer executable instructions stored thereon for determining a location of a key fob 12 for use in a vehicle remote function system. More specifically, the computer executable instructions stored on the computer readable medium may include instructions for performing any or all of the activities, functions or steps described above in connection with the system 10 or method 40 disclosed herein.

In that regard, the controller or ECU 24 may comprise an appropriately programmed processor or other hardware, software, or any combination thereof for performing the functions described herein, such as implementing a Kalman filter and/or other filters or techniques. The controller or ECU 24 may also comprise a memory, which may provide the computer readable medium and have the computer executable instructions stored thereon described above.

As is readily apparent from the foregoing, a vehicle remote function system and a method have been described for use in effectuating vehicle operations based on movement of a fob relative to a vehicle. The system and method use ultra-wide band wireless signals communicated between the fob and vehicle mounted antennas to detect movement of the fob within multiple zones proximate the vehicle, and generate a control signal for use in effectuating a vehicle operation based on the movement detected, which may be interpreted as indicative of a user command for the vehicle operation.

While various embodiments of a vehicle remote function system and a method for locating a key fob relative to a vehicle using ultra-wide band wireless signals have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A vehicle remote function system for use in effectuating vehicle operations based on movement of a fob relative to a vehicle, the system comprising:
a controller adapted to be mounted in the vehicle and configured for communication with a plurality of antennas adapted to be mounted at different locations in the vehicle, the controller for use in determining locations of the fob within zones proximate the vehicle based on ultra-wide band wireless signals transmitted between the antennas and the fob, the zones comprising an unlock zone and a plurality of additional zones, each additional zone at least partially within the unlock zone, wherein each of the additional zones is at least partially outside each remaining one of the additional zones;
wherein the controller is configured to track movement of the fob between additional zones in two different directions to activate a vehicle operation based on the tracked movement of the fob.

2. The system of claim 1 wherein the tracked movement of the fob between additional zones comprises a movement of the fob from a first one of the additional zones to a second one of the additional zones within a predetermined time period.

3. The system of claim 1 wherein each additional zone at least partially overlaps another additional zone.

4. The system of claim 1 wherein the tracked movement of the fob between additional zones comprises a presence of the fob in a first one of the additional zones for greater than a first period of time followed by a presence of the fob in a second one of the additional zones for greater than a second period of time.

5. The system of claim 4 wherein the tracked movement of the fob between additional zones further comprises, after the presence of the fob in the second one of the additional zones for greater than the second period of time, a presence of the fob in the first one of the additional zones for greater than a third period of time.

6. The system of claim 1 wherein the plurality of additional zones comprises three additional zones, and the tracked movement of the fob between additional zones comprises a first movement of the fob from a first one of the additional zones to a second one of the additional zones followed by a second movement of the fob from the second one of the additional zones to a third one of the additional zones, the first and second movements occurring with a predetermined period of time.

7. The system of claim 1 wherein the vehicle operation comprises headlamp activation, door opening, fuel door release, trunk release, perimeter light activation, alarm activation/deactivation or engine remote start.

8. The system of claim 1 wherein the unlock zone is located outside the vehicle and the plurality of additional zones are located adjacent a side, front and/or rear of the vehicle.

9. A method for use in a vehicle remote function system, the method for effectuating vehicle operations based on movement of a fob relative to a vehicle, the method comprising:
    transmitting ultra-wide band wireless signals between the fob and a plurality of antennas mounted in the vehicle; and
    determining locations of the fob within zones proximate the vehicle based on the wireless signals, the zones comprising an unlock zone and a plurality of additional zones, each additional zone at least partially within the unlock zone, wherein each of the additional zones is at least partially outside each remaining one of the additional zones;
    tracking movement of the fob between additional zones in two different directions; and
    activating a vehicle operation based on the tracked movement of the fob.

10. The method of claim 9 wherein the tracked movement of the fob between additional zones comprises a movement of the fob from a first one of the additional zones to a second one of the additional zones within a predetermined time period.

11. The method of claim 9 wherein each additional zone at least partially overlaps another additional zone.

12. The method of claim 9 wherein the tracked movement of the fob between additional zones comprises a presence of the fob in a first one of the additional zones for greater than a first period of time followed by a presence of the fob in a second one of the additional zones for greater than a second period of time.

13. The method of claim 12 wherein the tracked movement of the fob between additional zones further comprises, after the presence of the fob in the second one of the additional zones for greater than the second period of time, a presence of the fob in the first one of the additional zones for greater than a third period of time.

14. The method of claim 9 wherein the plurality of additional zones comprises three additional zones, and the tracked movement of the fob between additional zones comprises a first movement of the fob from a first one of the additional zones to a second one of additional zones followed by a second movement of the fob from the second one of the additional zones to a third one of the additional zones, the first and second movements occurring with a predetermined period of time.

15. The method of claim 9 wherein the vehicle operation comprises headlamp activation, door opening, fuel door release, trunk release, perimeter light activation, alarm activation/deactivation or engine remote start.

16. The method of claim 9 wherein the unlock zone is located outside the vehicle and the plurality of additional zones are located adjacent a side, front and/or rear of the vehicle.

* * * * *

UNITED STATES PATENT AND TRADEMARK OFFICE
CERTIFICATE OF CORRECTION

PATENT NO. : 9,852,560 B2
APPLICATION NO. : 14/178324
DATED : December 26, 2017
INVENTOR(S) : Jason G. Bauman et al.

Page 1 of 1

It is certified that error appears in the above-identified patent and that said Letters Patent is hereby corrected as shown below:

In the Claims

Column 9, Line 17, Claim 6:
After "the first and second movements occurring"
Delete "with" and
Insert -- within --.

Column 10, Line 31, Claim 14:
After "the first and second movements occurring"
Delete "with" and
Insert -- within --.

Signed and Sealed this
Seventeenth Day of April, 2018

Andrei Iancu
*Director of the United States Patent and Trademark Office*